Figure 1:
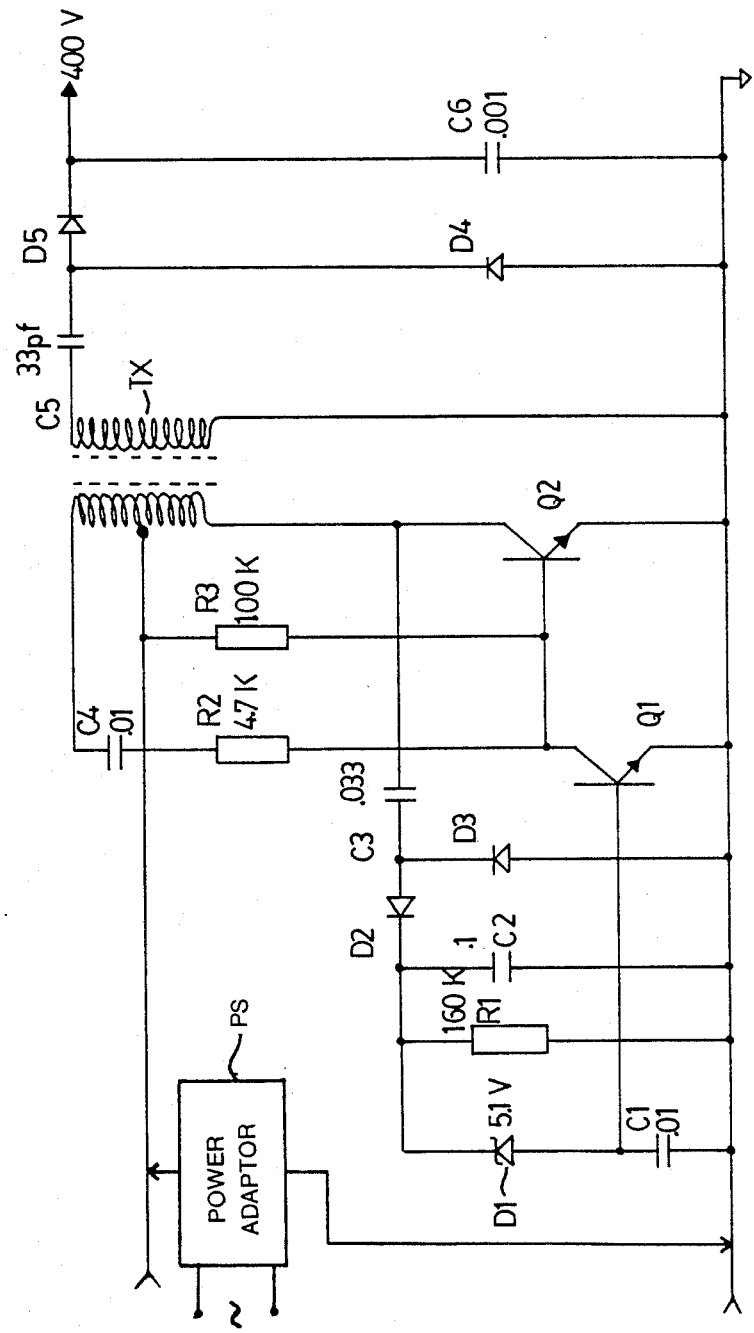

United States Patent [19]

Saubolle

[11] Patent Number: 4,818,884

[45] Date of Patent: Apr. 4, 1989

[54] LOW COST APPLIANCE FOR CONTINUOUSLY MONITORING LEVELS OF IONIZING RADIATION IN PREMISES FOR HUMAN OCCUPATION

[76] Inventor: Malcolm C. Saubolle, 2699 Battleford Rd, Th13, Mississauga L5N 3R9, Canada

[21] Appl. No.: 937,908

[22] Filed: Dec. 1, 1986

[51] Int. Cl.⁴ .............................................. G01T 1/18
[52] U.S. Cl. .................................... 250/388; 250/374; 340/600
[58] Field of Search ................... 250/388, 374, 390 B; 340/600

[56] References Cited

U.S. PATENT DOCUMENTS

| | | | |
|---|---|---|---|
| 3,654,442 | 4/1972 | Leonard et al. | 250/388 |
| 4,596,933 | 6/1986 | Waechter et al. | 250/374 |
| 4,642,463 | 2/1987 | Thoms | 250/388 |
| 4,721,857 | 1/1988 | Kronenberg | 250/374 |

FOREIGN PATENT DOCUMENTS

| | | | |
|---|---|---|---|
| 2296314 | 7/1976 | Fed. Rep. of Germany | 250/388 |
| 3145015 | 11/1981 | Fed. Rep. of Germany | 250/374 |

OTHER PUBLICATIONS

Radio Shack Dictionary of Electronics, 1978 pp. 84–694.

Primary Examiner—Carolyn E. Fields
Assistant Examiner—John A. Miller
Attorney, Agent, or Firm—Ridout & Maybee

[57] ABSTRACT

Apparatus for the continuous monitoring of levels of ionizing radiation in premises for human occupation is provided, including an enclosure for location in premises to be monitored, an ionizing radiation transducer within the enclosure and producing counts in response to radiation incidents, a power supply continuously providing an an operating potential to said radiation transducer, a time base defining monitoring intervals of at least about 5 seconds, a counter for accumulating counts during successive monitoring intervals, and alarm means responsive to the accumulated count during a monitoring interval exceeding a predetermined threshold representing a level of ionizing radiation which if continued over an extended period would expose a human being to a cumulative dosage exceeding a level deemed acceptable.

8 Claims, 2 Drawing Sheets

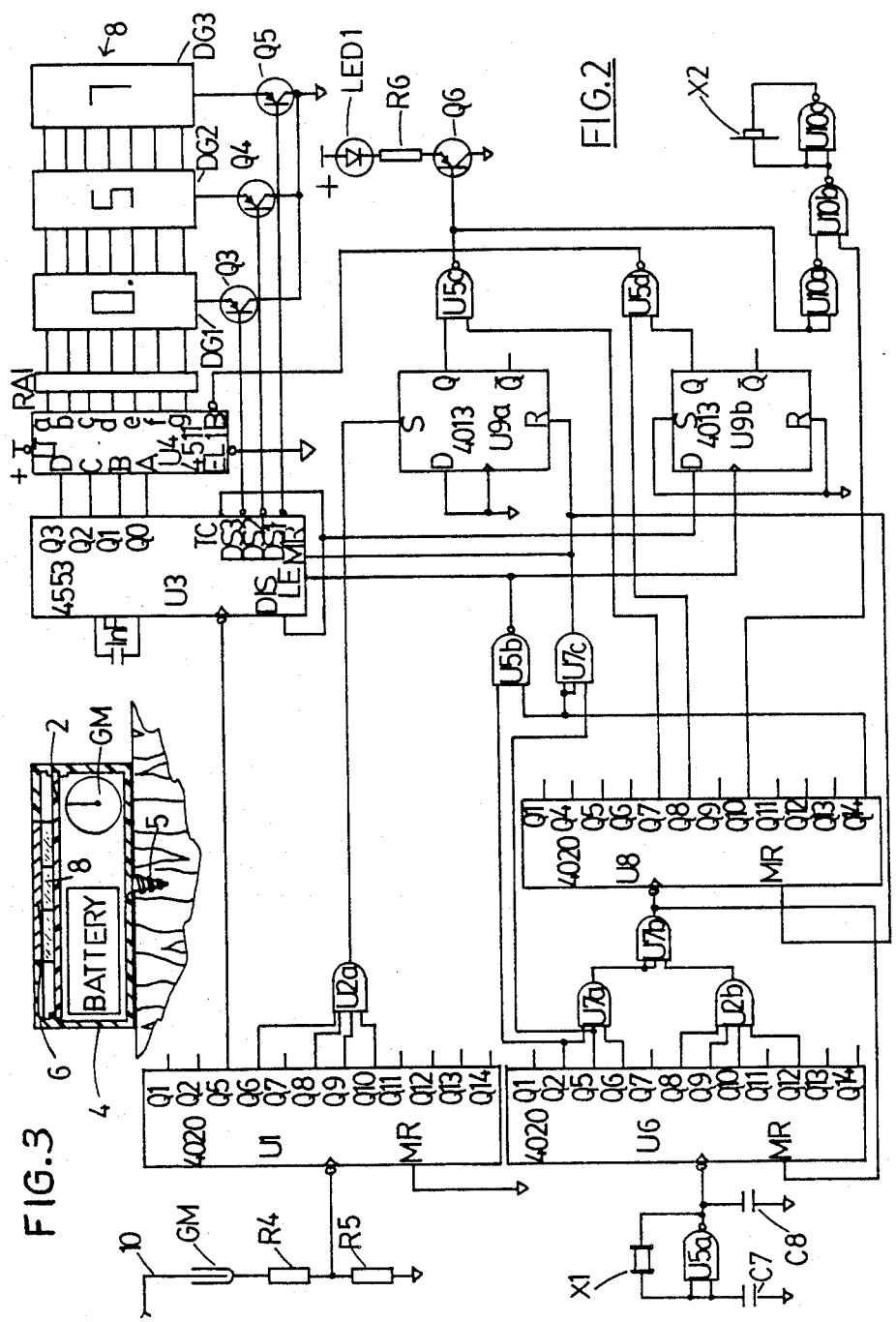

LOW COST APPLIANCE FOR CONTINUOUSLY MONITORING LEVELS OF IONIZING RADIATION IN PREMISES FOR HUMAN OCCUPATION

This invention relates to monitoring devices for nuclear radiation and more particularly to devices for monitoring exposure of persons to $\alpha$ and $\beta$ particles and $\gamma$ radiation.

Nuclear radiation detection instruments have long been known, and fall into two principal categories, utilizing ionization and scintillation transducers. Ionization transducers in turn may depend upon incident radiation causing ionization of gases or solids, particularly in semiconductors. The best known ionization detector is the Geiger-Muller tube or Geiger counter which is a modified form of proportional counter (a gas containing ionization chamber constructed so that gas amplification of the ionization caused by incident radiation results in an avalanche effect) in which the avalanche conduction caused by incident radiation is rapidly quenched by the presence of a quenching vapour. An incident ionizing particle or an ionizing event related to radiation will thus cause the tube to conduct briefly, producing a current pulse or count. The rate of production of such counts, which typically last a few microseconds, can be measured to provide an indication of the intensity of radiation. Such a counter can be sensitive to the entire spectrum of ionizing nuclear radiation, whether particulate or electromagnetic, and provided that a radiation event causes production of an ion pair, the output produced is independent of the type and energy of radiation event producing ionization. Moreover, such a tube is inoperative for a 'dead' period following a radiation event, which period is much longer than the pulse produced by the event. These properties limit the maximum level of radiation which can be measured by such a device, and the accuracy of measurement, since as the radiation intensity increases, an increasing number of events will be missed, and the device will eventually saturate. Moreover the absence of any assessment of the energy or type of radiation limits the usefulness of the device in many applications. Since ionization chambers and scintillation counters capable of providing much more accurate characterization of incident radiation have become available, the conventional Geiger counter has tended to fall into disfavour other than as a fairly crude portable detector for sources of elevated levels of radiation. A further disadvantage of the Geiger-Mueller tube is that it requires a fairly well regulated high voltage source for its operation, and whilst such sources can fairly readily be designed to be battery powered for portable operation, the current drain on the battery by such sources is significant.

Radiation detectors have commonly been utilized in applications in which a relatively expensive and sophisticated instrument is both necessary and acceptable, but there has long been a need for a means for detecting elevated radiation levels in domestic and commercial environments in which the presence of radioactivity at anything above normal background levels is highly undesirable. There has been increasing awareness for a number of years that there are various ways in which such elevated levels may occur without the awareness of persons living or working in a particular environment. For example, naturally occurring radon gas can accumulate in inadequately ventilated basements and other structures below grade level, or other radioactive material may be in the environment due to poor waste disposal practices, naturally occuring minerals, or airborne fallout from remote nuclear events. There is a need therefore for a device, analogous in function and comparable in price range and functionality to a domestic or commercial smoke detector, which can be permanently installed in domestic or business premises to provide warning of abnormally elevated radiation levels whose maintenance might constitute a health hazard to persons using the premises for extended periods. Currently available radiation detecting devices are not really suitable for this purpose. Available instruments are too expensive and sophisticated to be utilized as a permanent monitor for what would hopefully be a remote eventuality, and such instruments, together with conventional geiger counters would, if self powered, have wholly inadequate battery life for practical usage in such a manner.

Various radiation dosimeters for personal use are known, but these, although frequently simple in themselves, merely monitor cumulative dosage over an extended interval and in most cases require periodic replacement and special processing of the used units to recover useful information. They will not provide any direct indication of elevated radiation levels in a particular location.

Surprisingly, I have found that apparatus which is very effective in such an application can be based on the use of a Geiger-Mueller tube, and that what were thought to be disadvantages of that technology can be rendered either unimportant or become positive advantages. Since the primary objective of the instrument is to detect radiation levels only moderately elevated above normal background levels, the problems due to the 'dead' period after a count are unimportant, whilst the ability of the tube to detect all types of ionizing radiation indiscriminately is a positive advantage where the parameter being monitored is fitness for human habitation, and the purpose of the instrument is to warn of a potentially dangerous condition rather than carry out accurate measurements. Consistency and stability of response are more important in such conditions than absolute accuracy, particularly since current radiation exposure limits are based on estimates at best.

According to the invention, there is provided apparatus for the continuous monitoring of levels of ionizing radiation in premises for human occupation, comprising an enclosure for location in premises to be monitored, an ionizing radiation transducer within the enclosure and producing counts in response to radiation incidents, a power supply continuously providing an operating potential to said radiation transducer, a time base counting monitoring intervals of at least about 5 seconds, a counter for accumulating counts during successive monitoring intervals, and alarm means responsive to the accumulated count during a monitoring interval exceeding a predetermined threshold representing a level of ionizing radiation which, if continued over an extended period would expose a human being to a cumulative dosage exceeding a level deemed acceptable.

Preferably the ionizing radiation transducer is a Geiger-Mueller tube, means such as a digital readout is provided for indicating the level of incident radiation during the most recent monitoring interval, and the monitoring interval is about 30 seconds. An efficient power supply for the Geiger-Mueller tube is provided by peak rectification of the output of a step up transformer fed by a squegging oscillator.

A preferred embodiment of a radiation monitor in accordance with the invention is described with reference to FIGS. 1 and 2, which are schematic diagrams of the power supply and main circuit respectively, and FIG. 3 which is a diagrammatic sectional view through the monitor.

Referring to FIG. 3 a circuit board 2 carrying the components shown in FIGS. 1 and 2 is mounted in a small box 4 to be mounted by fasteners 5 in a location to be monitored, the box having a window 6 for a multi digit seven segment display 8.

The heart of the system is a Geiger-Mueller tube GM (see FIG. 2), to one electrode 10 of which is applied a 400 volt potential derived from the power supply shown in FIG. 1. The other electrode is connected to ground through a potential divider formed by resistors R4 and R5. This potential divider limits the current flowing in tube GM when an avalanche conduction occurs therein due to gas multiplication following formation of an ion pair by a radiation event, and also causes this current to develop a sufficient voltage in R5 to trigger the clock input of a multistage counter U1. The counter U1 may be an integrated circuit fabricated in CMOS technology, typically the industry standard 4020. Other integrated circuits utilized in the circuit of FIG. 2 are also 4000 series CMOS units. It will be understood that alternative parts providing equivalent functionality can be used, although the low power consumption, cheapness and ready availability of CMOS logic is advantageous.

Two further similar counter circuits U6 and U8 are cascaded to form a time base generating various timing signals from a clock formed by a crystal X1 in conjunction with a gate U5a and two low value capacitors C7 and C8. Gates U7a, U2b and U7b are located between outputs of counter U6 and a clock input of counter U8 so as to provide an appropriate division ratio by resetting counter U6. In the example shown, in which the resonant frequency of crystal X1 is 3.2768 MHz, the output Q14 of counter U8 goes high about once every half minute, generating a latch enable and reset signals. The reset signal not only resets the counter U8, but also a three decade counter U3 so as to reset the display 8. The latter receives a clock signal from counter U1 for each 32 counts sensed by the latter from tube GM, and drives the digits DG1, DG2 and DG3 of the display 8 both through transistors Q3, Q3 and Q5 connected to common cathodes of the digit segments, and through a BCD to seven segment decoder U4 connected to the segment anodes through appropriate load resistor provided by a resistor array RA1. The latch enable signal generated by gate U5b is timed to precede the reset signal generated by gate U7c sufficiently to enable the count from counter U3 to be transferred to the display just prior to resetting of the counters U3 and U8. Consequently, the display 8 displays a figure related to the number of counts by tube GM during a predetermined period. This form of display updating is commonly employed in digital meters, and any arrangement of equivalent functionality could be substituted. In particular, the use of a liquid crystal display may be preferred to light emitting diode displays because of their low power consumption, and these require somewhat different drive circuitry.

Selection of the update interval, which is also, as described below, a monitoring interval, is of some importance. Too short an interval is undesirable, since successive counts will then be subject to erratic variation due to the somewhat random nature of background radiation, and there is a possibility of short term radiation incidents giving rise to occasional high readings which might trigger false alarms. I believe that the monitoring interval should be at least about 5 seconds, and a longer interval is desirable. On the other hand, too long an interval is undesirable since one of the purposes of the instrument is to provide reassurance, and a long interval both makes it extremely difficult to demonstrate the instrument to prospective buyers, and may provide an impression that the device is not doing anything. A thirty second interval is short enough both for demonstration purposes, and for normal background radiation fluctuations to provide variations in the reading which will provide reassurance that the instrument is operating. Intervals of much over a minute provide what is seen by users to be excessively slow reaction to the presence of a radiation hazard.

The reset signal from gate U7c is also applied to reset the counter U1 and a flip-flop U9a. An AND gate U2a is used to detect attainment of a specific count state of the counter U1 and in response to attainment of such a count to apply a signal to set the flip-flop U9c. In the set state the flip-flop produces an output at terminal Q which is ANDed in gate U5c with a signal from counter U8 to render it intermittent. This intermittent signal is amplified by PNP transistor Q6 so as to drive a light emitting diode LED 1 having a series resistor R6, so as to provide a flashing warning signal, and is applied via gate U10a and U10b to an oscillator formed by gate U10c and a ceramic resonator X2 so as to provide an audible warning, the audible warning being further modulated by an additional signal derived from counter U8 and applied to the gate U10b.

The power supply for the tute GM is shown in FIG. 1. Typically, high voltage power supplies for battery operated equipment make use of a blocking oscillator circuit utilizing a ferrite core transformer, the high voltage being obtained by rectifying the output of a secondary winding on the transformer.

Because of the small size of the ferrite core transformer, and the large turns ratio required, only a few primary turns can be used. This gives rise to a high-Q, low inductance winding which rings when excited. When the current draw on the secondary is low, the high Q of the primary causes the oscillator to ring continuously generating a sine wave which absorbs much more power than the output delivers, resulting in inefficient operation.

To overcome this, I achieve a similar effect to that of a blocking oscillator, by applying controlled feedback to cause the oscillator to squeg at a controlled rate, with an on time just long enough to maintain a high voltage storage capacitor at a required voltage. This control is achieved with selective feedback.

The collector load of transistor Q2 is half of the primary winding of the transformer TX, having a turns ratio of about 1:50. At switch on, a small amount of base current flows to transistor Q2 through resistor R3. This causes the transistor to switch on and the collector potential to move towards ground. The other end of the primary winding being in antiphase to the collector, with feedback to the base of Q2 through capacitor C4 and resistor R2, the primary winding is set in oscillation.

The frequency of oscillation is the natural frequency of the primary, altered by the reflected capacitance from the secondary circuit and the effect of capacitor C4, which blocks direct current in the feedback circuit, whilst resistor R2 limits the feedback current to a level which conserves energy and restricts the rate of build up of oscillator amplitude.

The oscillation at the collector of Q2 is coupled to a D.C. restorer/peak detector circuit formed by diodes D2 and D3. During negative half cycles capacitor C3 is charged to the negative peak through D3. During positive half cycles the charge on capacitor C3 boosts the positive half cycle so as to charge capacitor C2 to the peak to peak value via diode D2. Whilst capacitor C2 is charging to peak value, capacitor C4 is also charging to the average value of the signal developed across the feedback coil, which in the example shown using a 6 volt supply, settles above the 6V. input level. In the meantime the charge on capacitor C2 builds up until the voltage across it exceeds the zener voltage of a zener diode D1. As soon as this voltage is reached, the zener diode conducts, causing current to flow to the base of a transistor Q1, which conducts and thus disables Q2.

The charge on capacitor C4 drives the base of transistor Q2 negative, holding it off until this charge decays via resistors R2 and R3 to a point at which transistor Q2 can again conduct, causing a further cycle to commence. Resistor R1 causes capacitor C2 to discharge below the zener voltage of D1 until the base current is removed from transistor Q1 thus switching it off and allowing current to flow back into the base of transistor Q2 via R2 and R3. Capacitor C1 allows a smooth transition. The feedback circuit maintains the peak to peak value amplitude of the oscillator constant with the zener diode acting as a reference. The zener diode carries only the base current of transistor Q1, thus keeping low the total power consumption of the circuit.

In the secondary circuit, capacitors C5 and C6 and diodes D4 and D5 form a voltage doubler circuit which generates the required D.C. potential, 400 volts in this example. The value of C5 is chosen as a compromise between high voltage and good regulation. The smaller the value of capacitor C5 the higher the output voltage and vice versa, whereas the larger the value of capacitor C6, the higher the output voltage and the greater the power loss in the circuit.

In use, the instrument is provided with a power source; typically batteries will be utilized, with conventional provision for a plug in mains adaptor pS for use with a domestic power supply to avoid battery drain when a mains supply is available. The power supply will start up and generate a potential of about 400 volts across C6, which potential is applied to tube GM. The tube responds to radiation incidents occurring within its envelope by applying pulses to the counter U1 which in turn provides scaled pulses to the counter U3, and signals attainment of a predetermined count to the set input of the flip-flop U9a which is reset by the reset signal from gate U7c. Normally, the flip-flop and the counter U1 will be reset before the predetermined count is attained, the flip-flop U9a will not attain the set condition, and thus the light emitting diode LED 1 and the buzzer X2 will not be activated. When the mean incidence of ionizing radiation upon the tube GM during a monitoring period rises above a level equivalent to an annual dosage equivalent of 5 Rem per annum, the apparatus is set up so that counter U1 will reach the count required to set flip-flop U9A before the latter is reset by the reset signal. In the intervening period, the diode LED1 will flash and the buzzer X2 will beep, with the period of flashing and beeping becoming longer as the radiation level increases. Assuming the monitoring period to be 30 seconds, then for the tube utilized (APTEC (Trade Mark) EWH10), the count over a period of 30 seconds equivalent to an annual exposure of 5 Rem is 1856, and with the arrangement shown, the display 8 will show the dosage rate in millirems/hour, 0.57 millirems/hour being equivalent to 5 Rems/year.

Although the circuit described makes use of discrete components, it will be understood that all of the function other than the immediate drivers for the display and alarm indications could readily be implemented by an appropriately programmed microcomputer chip. Further functions could be implemented such as dosage totalization over prolonged periods such as months or years, whilst the presence of a time base and display means that a clock indication could readily be implemented; in fact the apparatus could be built into a wall clock.

As the instrument stands, it is neither strictly comparable to conventional instruments measuring instantaneous levels of radiation, nor dosimeters which measure cumulative radiation exposure of a subject: rather it provides a warning of the existence of radiation levels which, if sustained, could result in an excessive cumulative dose being absorbed by persons occupying premises being monitored. By the addition of a cumulative counter, the device can be turned into an instrument measuring cumulative exposure, over a prolonged period of persons in continuous occupation, or in a portable version it could be utilized as a personal dosimeter.

I claim:

1. Apparatus for the continuous monitoring of levels of ionizing radiation in premises for human occupation, comprising an enclosure, means for mounting the enclosure to structure within premises to be monitored, an ionizing radiation transducer within the enclosure and producing counts in response to radiation incidents, a power supply means continuously providing an operating potential to said radiation transducer, a time base defining monitoring intervals fixed between about 5 to about 60 seconds, a counter means for accumulating counts during successive monitoring intervals, alarm means responsive to the accumulated count during a monitoring interval exceeding a predetermined threshold representing a level of ionizing radiation which if continued over an extended period would expose a human being to a cumulative dosage exceeding a predetermined level deemed acceptable, and indicator means for indicating the level of incident radiation during the most recent monitoring interval, the ionizing radiation transducer being a Geiger-Mueller tube, wherein the alarm means is arranged to remain functional only for the balance of each monitoring interval in which the accumulated count exceeds said predetermined threshold.

2. Apparatus according to claim 1, wherein the predetermined threshold is a count over the monitoring interval equivalent to a radiation dosage of 5 Rem/year.

3. Apparatus according to claim 1, wherein the indicating means is a digital readout updated at the end of each monitoring interval.

4. Apparatus according to claim 3, wherein the monitoring interval is about 30 seconds.

5. Apparatus according to claim 1, further including means to enable the apparatus to be powered from a domestic power supply.

6. Apparatus for the continuous monitoring for human occupation, comprising an enclosure, means for mounting the enclosure to structure premises of levels of ionizing radiation in premises to be monitored, an ionizing radiation transducer within the enclosure and producing counts in response to radiation incidents, a power supply means continuously providing an operating potential to said radiation transducer, a time base defining monitoring intervals fixed between about 5 to about 60 seconds, a counter means for accumulating counts during successive monitoring intervals, alarm means responsive to the accumulated count during a monitoring interval exceeding a predetermined threshold representing a level of ionizing radiation which if continued over an extended period would expose a human being to a cumulative dosage exceeding a predetermined level deemed acceptable and indicator means for indicating the level of incident radiation during the most recent monitoring interval, the ionizing radiation transducer being a Geiger-Mueller tube, wherein the power supply means for the Geiger-Mueller tube comprises a squegging oscillator incorporating an inductive element which is the primary of a step up transformer, and the secondary of the transformer feeds a peak detector whose output provides an operating potential for the Geiger-Mueller tube, and a potential divider in series with the tube generates the counts.

7. Apparatus according to claim 6, wherein the squegging oscillator comprises two independent feedback paths, a first phase-shifting feedback path to produce the principal oscillation, and a second feedback path which includes means to peak rectify the oscillation and compare its amplitude with a reference, means to disable the oscillator in response to attainment of a predetermined amplitude, and time constant means to delay re-enablement of the oscillator to set the rate of squegging.

8. Apparatus according to claim 7, wherein the reference is a zener diodeiin series with the second feedback path.

* * * * *